Feb. 2, 1937.   H. H. KLEIN   2,069,371
DISPENSING DISH
Filed May 5, 1936
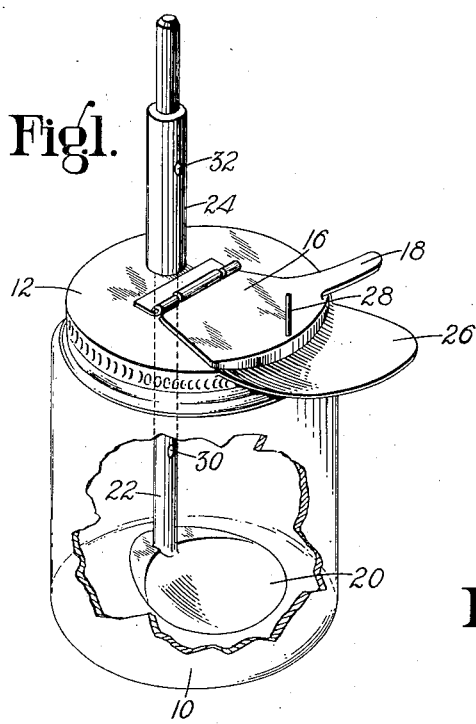
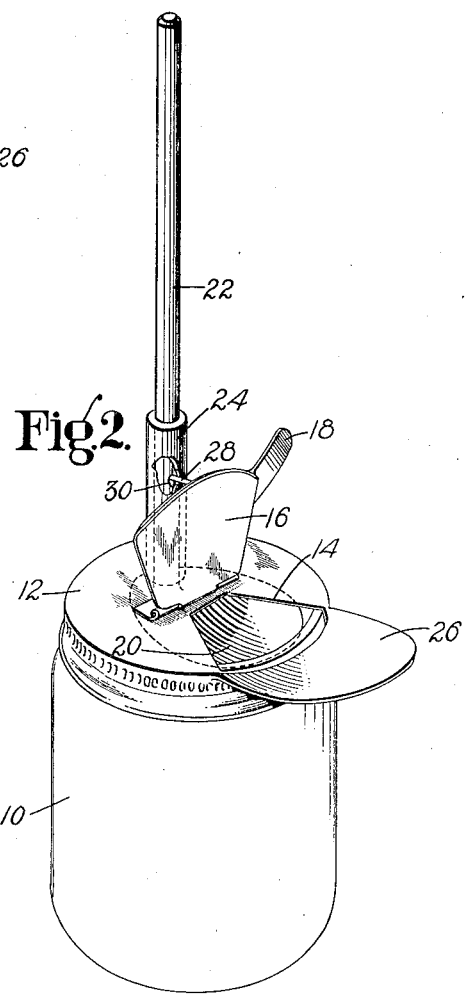
INVENTOR
Hyman H. Klein,
By his Attorney
Harlow M. Davis Patented Feb. 2, 1937

2,069,371

UNITED STATES PATENT OFFICE 2,069,371

DISPENSING DISH

Hyman H. Klein, Lynn, Mass., assignor to United Shoe Machinery Corporation, Paterson, N. J., a corporation of New Jersey Application May 5, 1936, Serial No. 78,020

6 Claims. (Cl. 91—66)

This invention relates to dispensing dishes and more particularly to a closure adapted to be attached to a receptacle, such as a glass jar, which may be the original container in which the material to be dispensed has been sold.

When it is desired to utilize liquid materials, such as paints, finishes, cements and the like, in small quantities, protection must be afforded for the unused material against evaporation and the admission of dirt. It will be obvious, furthermore, that the dipping of an applying device, such as a rag or a sponge, into a receptacle containing a considerable quantity of such material is wasteful and apt to contaminate the whole quantity of material. It is desirable, therefore, to provide a dispensing dish by which small quantities of the material may be made available while protecting the remainder of the material. In the case of some paints and cements, the solvents employed are inflammable and this makes it all the more desirable not to expose large quantities of such material at a time, in shoe factories, for example.

An object of the present invention is to provide an improved dispensing dish having a closure which facilitates the delivery and use of small quantities of material in the dish without exposing the remainder of the material.

In accordance with features of the invention and as herein illustrated, the closure for the receptacle has an outlet opening which is provided with a movable cover. Just outside this outlet opening is preferably a lip which prevents dripping and serves to support a sponge or the like. The dipping device, which is a spoon, is movably mounted on the closure and, when raised to a position immediately subjacent to the outlet opening, substantially closes the same. Provision is also made for holding this spoon in its raised position. This is accomplished by a latch attached to the movable cover on the closure so that the cover will hold the spoon raised when in open position and will allow it to fall back into the receptacle when the cover is closed.

In the drawing,

Fig. 1 is an angular view of a dispensing dish embodying my invention and showing the cover in closed position and the dipping device dropped to the bottom of the receptacle, and Fig. 2 is a similar view with the dipping spoon raised and held in raised position by a latch on the open cover.

The dispensing dish is illustrated as comprising a receptacle 10 in the form of a glass jar such as is frequently employed for the sale and distribution of paints, finishes and other materials, and the closure 12 is shown as comprising a screw cap attached to the jar by means of a thread formed thereon. This closure is provided with an outlet opening 14. When the dish is not in use, the opening may be closed by a hinged cover 16 having a handle 18.

Small quantities of material may be separated from the amount which is contained in the receptacle 10 by means of a dipping spoon 20 having a vertical stem 22 which is movably supported in a guide tube 24 attached to the closure 12. The shape of this spoon 20 is such that when it is in raised position, as shown in Fig. 2, it substantially closes the outlet opening and delivers a small quantity of material in which a sponge or cloth may be dipped as material is utilized. To prevent the material from being carried over the edge of the closure on to the jar, a lip 26 is provided which is slightly cupped and serves as a convenient support for a sponge or other applying device. Any material dragged forward during the dipping movement of the applying member will be received on this lip or shelf rather than being allowed to dribble down the side of the container.

In order to hold the spoon in this raised position ready for the removal of the material contained therein, a latch is provided comprising a pin 28 on the hinged cover and a pair of holes in the stem and guide. The hole 30 in the stem will come into registration with the hole 32 in the guide when the spoon is raised into the position shown in Fig. 2, and then the pin 28 on the cover may be caused to enter these registering holes and hold the spoon in its raised position. As soon as the cover is closed, either accidentally or intentionally, the spoon 20 will drop back into the body of the material, thus keeping it from being gummed up by exposure to the air.

With this arrangement, only small quantities of the material are delivered at a time and protection is afforded for the remaining material in the dish by means of a construction which is both simple and inexpensive.

Having described my invention, what I claim as new and desire to secure by Letters Patent of the United States is:

1. A closure for a receptacle comprising, in combination, a dipping device movably attached to said closure and arranged to be operated from the outside thereof, said closure being provided with an opening, and means to retain said dipping device in a position closely subjacent to said opening 2. In combination, a closure having an opening, means movably attached to said closure for dipping a small quantity of material from a receptacle to which the closure is attached, and means outside said closure for operating said dipping device to raise it into a position subjacent to said opening thereby substantially to close the same.

3. In combination, a closure having an opening, means movably attached to said closure for dipping a small quantity of material from a receptacle to which the closure is attached, means outside said closure for operating said dipping device to raise it into a position subjacent to said opening thereby substantially to close the same, and a latch for retaining said dipping device in its raised position.

4. In combination, a closure having an opening, a dipping spoon shaped substantially to close said opening, operating means for said dipping spoon extending through said closure and operable from outside the same to lift the spoon into registration with the opening, and a latch for engaging said operating means to hold the spoon in raised position.

5. In combination, a closure having an opening, a cover for said opening movably mounted on the closure, and a dipping device movably mounted on the closure arranged to be raised to a position subjacent to said opening, said cover being constructed and arranged to cooperate with said dipping device to hold it in raised position when the cover is moved to open position.

6. In combination, a closure having an outlet opening, a lip on the closure adjacent to the opening, a hinged cover for said opening, a dipping spoon movable in a guide on said closure, and means on said cover cooperating with said guide and said spoon to hold the spoon in raised position beneath the opening.

HYMAN H. KLEIN.